United States Patent [19]
Walker

[11] Patent Number: 5,825,863
[45] Date of Patent: Oct. 20, 1998

[54] PREPAID LIMITED USAGE CALLING CARD

[75] Inventor: Jay S. Walker, Ridgefield, Conn.

[73] Assignee: Walker Asset Management Limited Partnership, Stamford, Conn.

[21] Appl. No.: 570,443

[22] Filed: Jun. 17, 1996

[51] Int. Cl.[6] .......................... H04M 17/00; H04M 15/00
[52] U.S. Cl. .......................... 379/144; 379/121; 379/196
[58] Field of Search .................... 379/67, 88, 89, 379/112, 114, 115, 121, 133, 134, 216, 355, 356, 359, 188, 189, 196, 197, 199, 200

[56] References Cited

U.S. PATENT DOCUMENTS

| | | | |
|---|---|---|---|
| 4,706,275 | 11/1987 | Kamil | 379/144 |
| 4,893,330 | 1/1990 | Franco | 379/196 |
| 4,975,942 | 12/1990 | Zebryk . | |
| 5,163,086 | 11/1992 | Ahearn et al. . | |
| 5,204,894 | 4/1993 | Darden | 379/216 |
| 5,222,121 | 6/1993 | Shimada | 379/355 |
| 5,249,219 | 9/1993 | Morganstein et al. | 379/197 |
| 5,287,403 | 2/1994 | Atkins et al. . | |
| 5,359,642 | 10/1994 | Castro . | |
| 5,546,446 | 8/1996 | Tsunokawa et al. | 379/144 |

OTHER PUBLICATIONS

*College Talk*, www.adforce.com/video/ctalk.html.
*College Students May Learn the Hardest Accounting Lessons Outside the Classroom*, Orange County Register, Liz Pulliam, p. K01, Sep. 1, 1996.
*Kids' Phone Usage Another Way for Marketers to Get Connected*, Phillips Business Information, Inc., Selling to Kids, Jan. 22, 1997.
TCI Control, Inc. (Programmable call controller for selective call control), 1990.

*Primary Examiner*—Curtis Kuntz
*Assistant Examiner*—Palu Loomis
*Attorney, Agent, or Firm*—Morgan & Finnegan LLP; Jeffrey L. Brandt

[57] ABSTRACT

The present invention provides a system that embodies an apparatus and method for enabling prepayment of telephone call charges in connection with a calling-card, the authorized called telephone number(s) being selectable by the cardholder so that the calling-card account can only be charged for telephone calls made to the cardholder authorized telephone number(s), the calling-card account capable of being continuously recharged from a linked credit account, bank account or the like, or charges may be incurred thereafter on a perunit-time basis.

21 Claims, 8 Drawing Sheets

PREPAID LIMITED USAGE CALLING CARD

BACKGROUND

The present invention generally relates to a system and methodology for enabling prepayment of telephone calls with a prepaid calling-card, and more particularly, to a system which permits a calling-party to make telephone calls chargeable to an account associated with the calling-card to a single number or a selected group of telephone numbers designated by the cardholder (e.g., the cardholder's home number, business number, etc.).

It is well-known in the prior art to prepay for telephone calling charges, and several different methods directed to this end exist. One of these is implemented through a calling-card that essentially operates as a telephone credit card. In its generic form, to use a calling-card, the calling-party (the cardholder or his designated user) first dials the party to be called ("the called-party" ), such as 0+area code+number and, after the hearing a signal tone, he or she enters their assigned unique calling-card PIN code. The PIN code is communicated via the telephone network to a central computer, and the PIN validity is checked by comparing the same with known PINs stored in a PIN database. If the central computer determines that the PIN code is valid, it signals the telephone switching network to enable the call to be connected to the called-party. The cost incurred in connection with the call is contemporaneously or subsequently billed to the cardholder's account associated with that PIN code. For certain calling-card services, a calling-party may need to dial a specific long distance network access code, or possibly a toll-free 800 number in order to use a specific calling-card at pre-agreed rates for such calls.

The prior art calling-cards have several disadvantages that are well known. Their primary drawback resides in the reality that if the PIN code is compromised, anyone who obtains the PIN code is virtually free to make unlimited calls charged to the calling-card account until such misuse is discovered by the issuing agency and the card issuer is notified. Even if the cardholder "lends" the calling-card to a child or someone else, the cardholder has no control over the usage of the card. A borrower may make excessive calls and incur large charges that are unknowingly billed to the cardholder's account. Moreover, the use of PIN codes is somewhat onerous, as they can be difficult to remember.

A second method for implementing prepaid telephone access is through the use of a non-rechargeable prepaid calling-card. As described above, each cardholder has an associated account. Such prepaid or debit cards are typically sold for a fixed retail price in return for a specified number of minutes of calling time. In this regard, the calling time is sometimes characterized as "units" instead of minutes, so that foreign calls with higher unit-per-minute charges can be made. To use such a prepaid calling-card, the calling-party typically calls a toll-free 800 number printed on the card to access the access switch for the particular telephone carrier that issued or is otherwise associated with the card. After a prompt, the calling-party dials a PIN code followed by the number of the call party. The length of the call is monitored by the telephone carrier and the cost of the call is automatically deducted from the account balance. When the prepaid amount of time (or units) is exhausted, the call is automatically disconnected and the card may be discarded. Further to the aforementioned disadvantages, these calling-cards have additional drawbacks. Since calls to be made with such calling-cards must be paid for in an advance lump sum, the cardholder effectively pays for calls weeks or even months before they are actually made. If this prepaid time is not fully used, the cardholder loses his or her money and the "breakage" is kept by the seller. Further, if the card is lost, so is the remaining time unless the cardholder knows the 800 number and his or her PIN code.

A modification of the aforementioned calling-card is known as a rechargeable prepaid calling-card. This calling-card may be "recharged" by purchasing additional time (e.g., in blocks of minutes). Notwithstanding the ability to continue use of the card after the associated account has been depleted, the rechargeable prepaid calling-card has the same shortcomings as the non-rechargeable prepaid calling-card. In addition, most rechargeable cards are more expensive than their non-rechargeable counterparts, because of higher overhead costs (e.g., the cost of live operator intercepts in order to handle purchasing transactions for additional time).

In view of the foregoing, there exists a need for a prepaid calling-card system, in which the cardholder's liability is minimized in the event of calling-card theft or loss, and which further enables the cardholder to authorize another calling-party to use of the card to call cardholder a designated number (e.g., the cardholder's home telephone number), or a specified group of telephone numbers. In addition, there exists a need for a prepaid calling-card system that links payment to some other cardholder account to simplify the recharging procedure in the event that additional calling time is desired.

SUMMARY OF THE INVENTION

Accordingly, it is an object of the present invention to provide a system embodying a method and apparatus for authorizing and billing telephone calls in connection with a prepaid calling-card, wherein the cardholder prepays for a specified period of calling time (or units) for calls made to a specified telephone number(s) of the cardholder's choosing.

To satisfy the aforementioned needs, a prepaid calling-card system is disclosed. Specifically, the system includes a call processor connected to a switching network, which in turn, has a calling telephone station and a called telephone station connected thereto. A memory, which is connected to the call processor, stores at least one authorized number. The authorized number is associated with an account having a prepaid account balance. The call processor is operative to compare a called number received from the calling telephone station with the stored authorized number. The call processor is further operative to control the switching network to complete a call between the calling telephone station and the called telephone station if the called number matches the stored authorized number. The call processor is also operative to decrement the prepaid account balance based upon the cost of the call.

A method of connecting a call between a calling telephone station and a called telephone station is also disclosed. The method includes the steps of storing an authorized number associated with an account, receiving a called number from the calling telephone station, and comparing the called number to the authorized number. Upon determining that the called number matches the authorized number, connection of a call between the calling and called telephone stations is initiated. Having initiated connection of the call, the account is decremented based on the call.

DETAILED DESCRIPTION OF THE PREFERRED EMBODIMENTS

Figure 1:
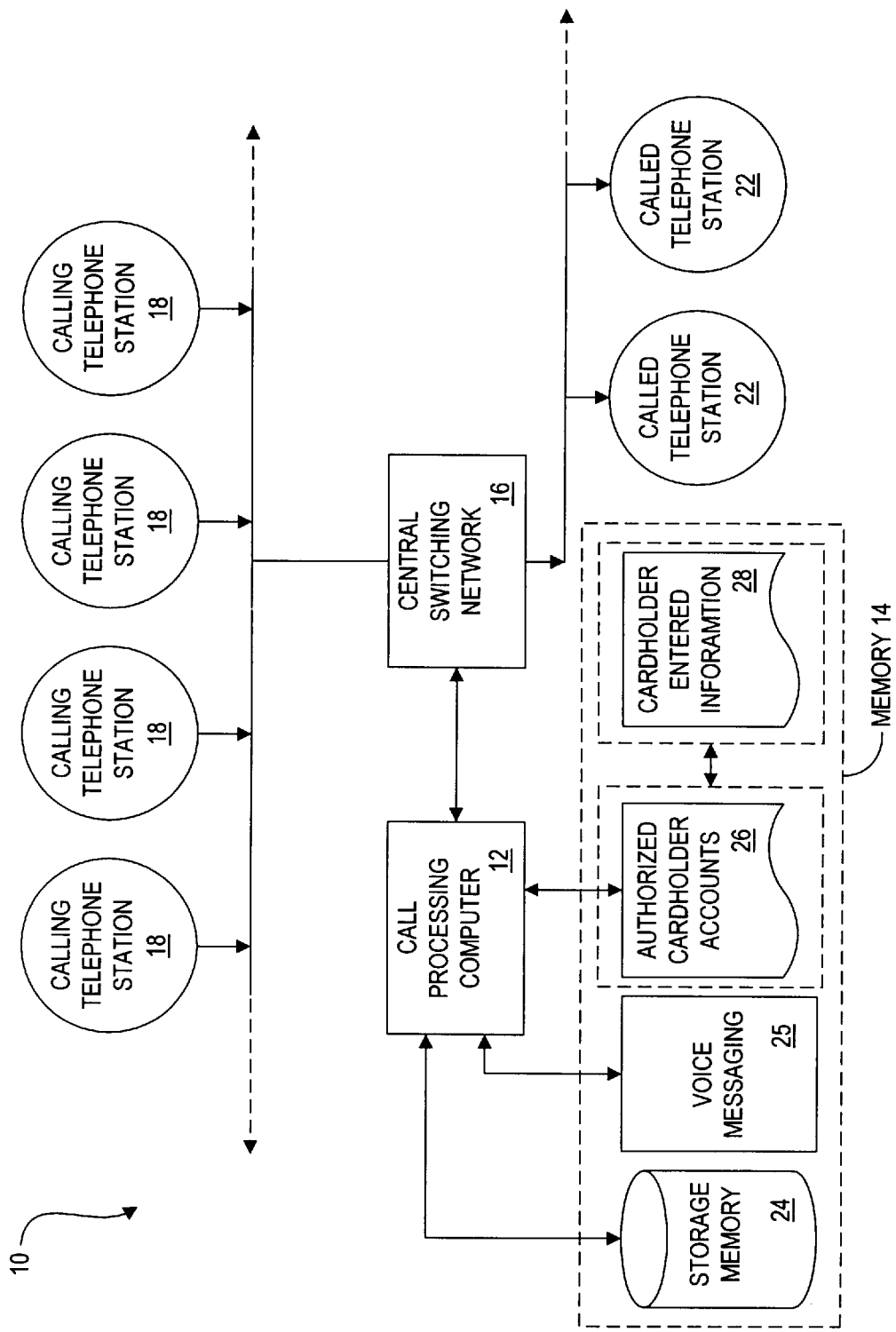
FIG. 1 is a schematic representation of a telephone system according to one aspect of the present invention, depicting a plurality of telephone stations connected to a central switching station and a call processing system.

With reference to the several views of the drawings, there are depicted several embodiments of a prepaid calling-card system, generally denoted by the reference numeral 10.

Referring now to FIG. 1, the system 10 generally comprises a call processing computer 12, including associated memory 14, and a central switching network 16. A plurality of calling telephone stations 18 are accessible to the central switching network 16 as is well-known in the art. A person making a telephone call (the calling-party) with a prepaid calling-card 20 in accordance with the invention (see FIG. 5), first dials a general-access telephone number, which number may be indicated on a face of the calling-card 20, on a calling telephone station 18. The term "calling-party," as used herein refers to the cardholder and/or anyone to whom the cardholder authorizes use of the calling-card 20 and associated calling-card account. General access is typically obtained via a universal 800 number (i.e., the same for all cardholders), but can be any predetermined telephone number. To facilitate ease of use, the access number may be embodied as a mnemonic such that persons who might otherwise be easily intimidated or confused by long PIN numbers can use the calling-card 20. Dialing the general access number connects the calling-party to the call processing computer 12 via the central switching network 16. The call processing computer 12 enables the calling-party to connect to the called telephone station 22, and further manages customer accounts and billing for calling charges. Alternatively, billing may be made via an independent billing system (not shown), or directly to another authorized account such as a credit card or bank account. To enable multiple cardholders and/or calling-parties to simultaneously utilize the system 10, multiple connections and networks may be employed as is well known.

After the calling telephone station 18 connects to the call processing computer 12 via the central switching network 16, the calling party enters the telephone number of the called telephone station 22. This telephone number is designated by the cardholder, and can be the telephone number of anyone, such as the cardholder's home number, that of a family member. Even a selected group of numbers may be designated. In all events, the calling-card has limited usage as defined by the cardholder, and the liability associated with theft or loss of the calling-card 20 is thereby minimized. Alternatively, the account and card may be arranged such that the calling-party simply enters a code unique to the cardholder and/or his account. In such an embodiment, if the code is associated with a single telephone number (e.g., the cardholder's home number), upon verification of the code, the call to this designated telephone number is automatically connected.

The telephone number or code is read by the call processing computer 12 and stored in storage memory area 24 within memory 14. The call processing computer 12 then compares the called telephone station's number with a list of authorized cardholder accounts contained in an authorized cardholder accounts database 26 to determine whether the cardholder has a chargeable account. The authorized cardholder accounts database 26 includes a list identifying authorized cardholders and an updatable account balance for each cardholder's account. Memory 14 also contains a cardholder entered information database 28 which provides for selecting authorized called station numbers, time limits, recharging the calling-card, etc. In the course of use, if the call processing computer 12 determines that the attempted call to the called telephone station 22 is allowable, that telephone number is routed to the central switching network 16, which thereafter connects the call to called telephone station 22. Memory 14 further includes a memory area 25 used to implement a redial messaging service as described in more detail below.

Figure 2A:
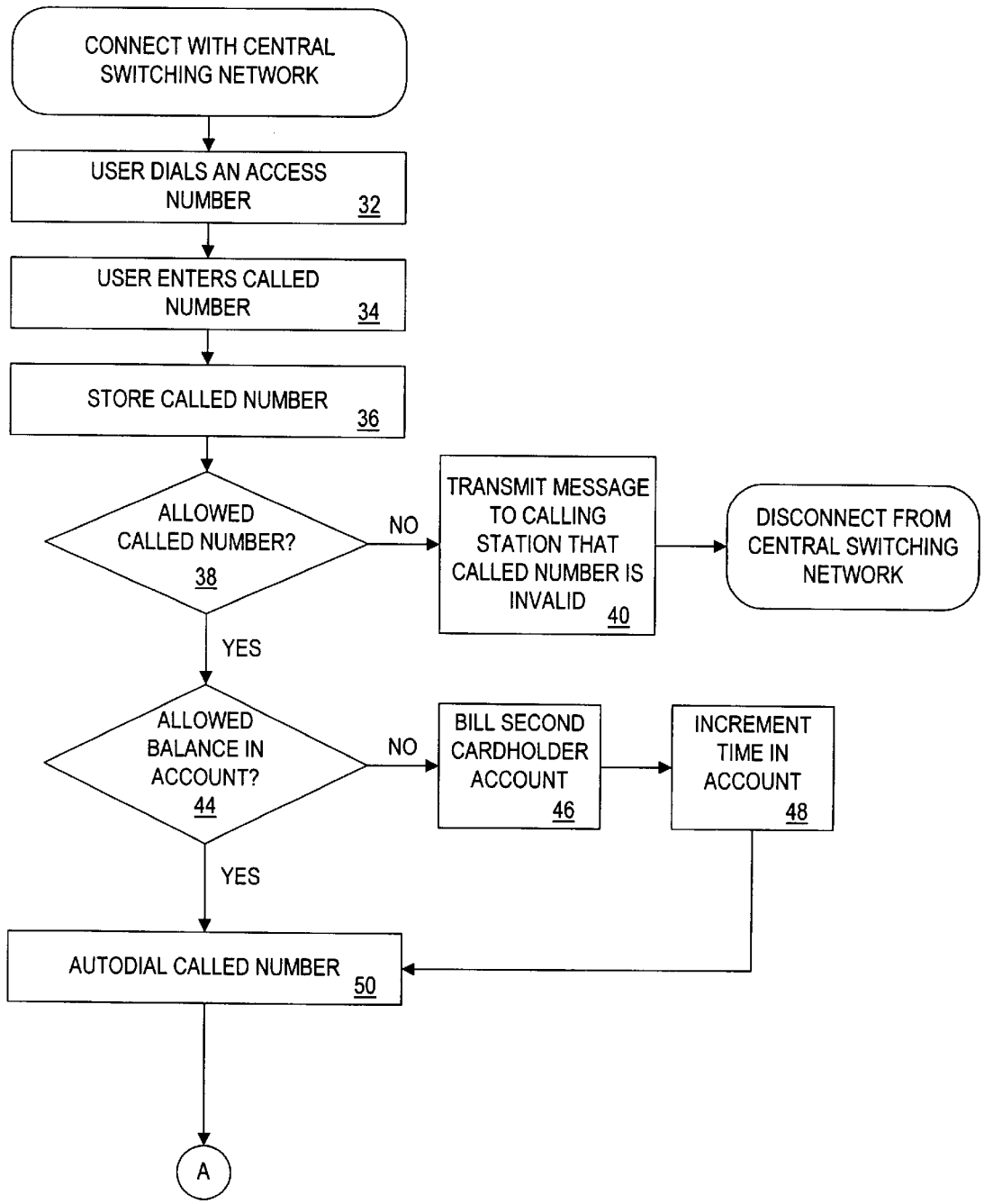
FIGS. 2A–B are functional block diagrams of a first embodiment of the calling-card system.
Figure 2B:
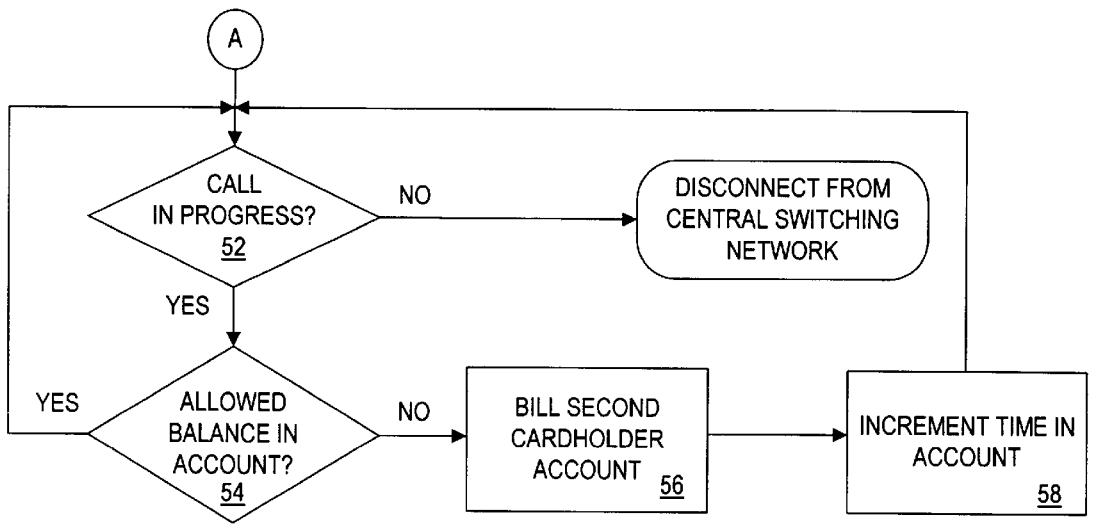
Figure 3A:
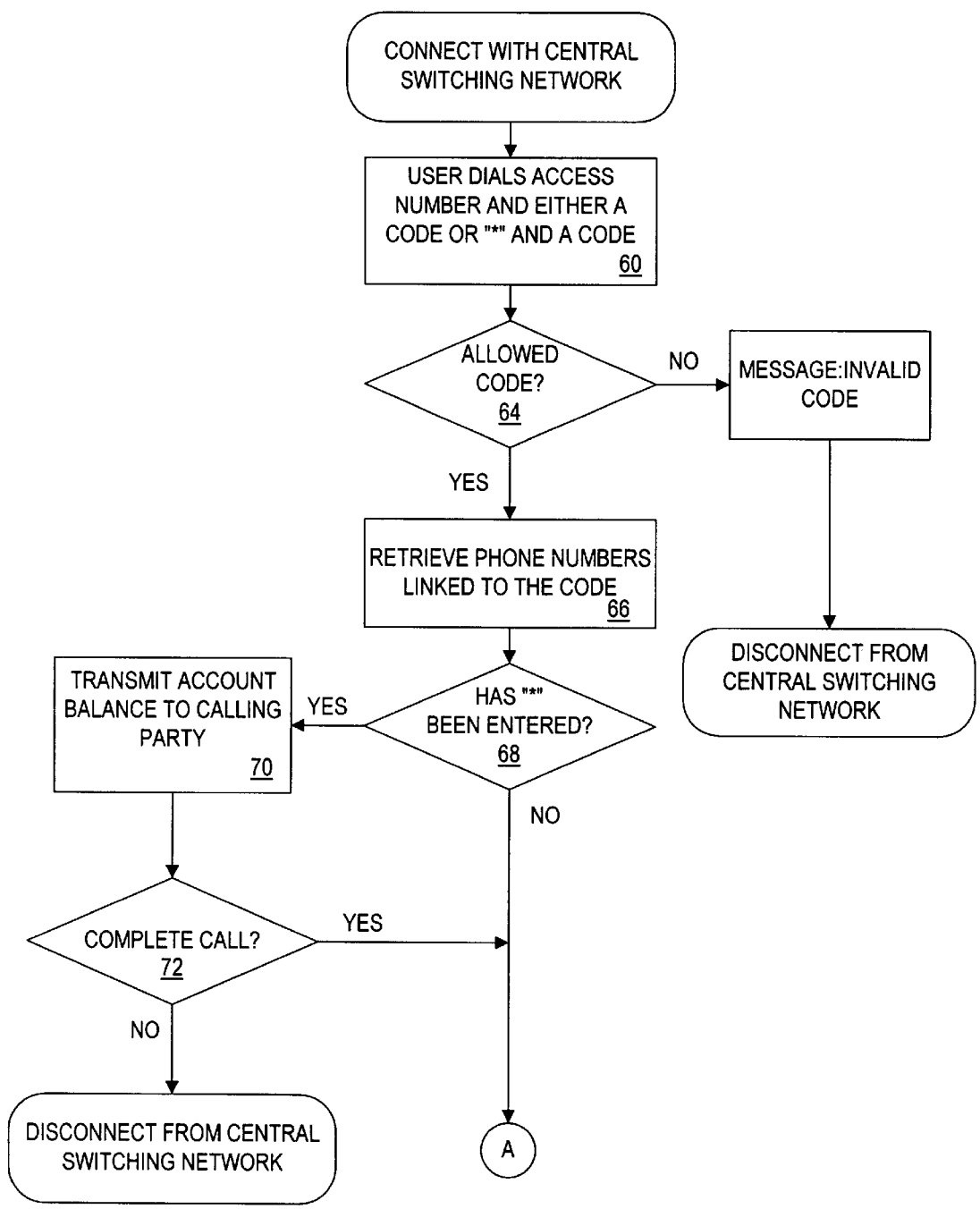
FIGS. 3A–C are functional block diagrams of an alternative embodiment of the calling-card system.
Figure 3B:
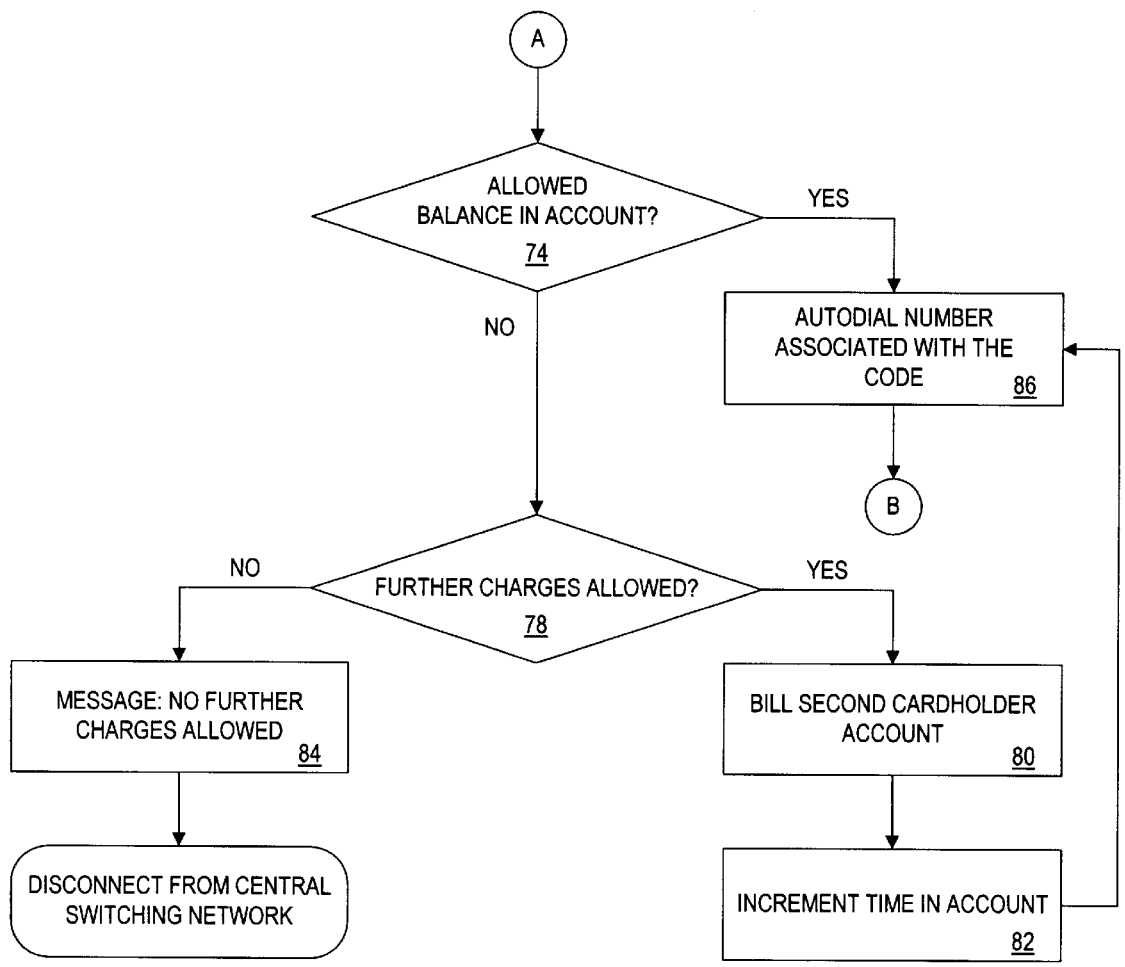
Figure 3C:
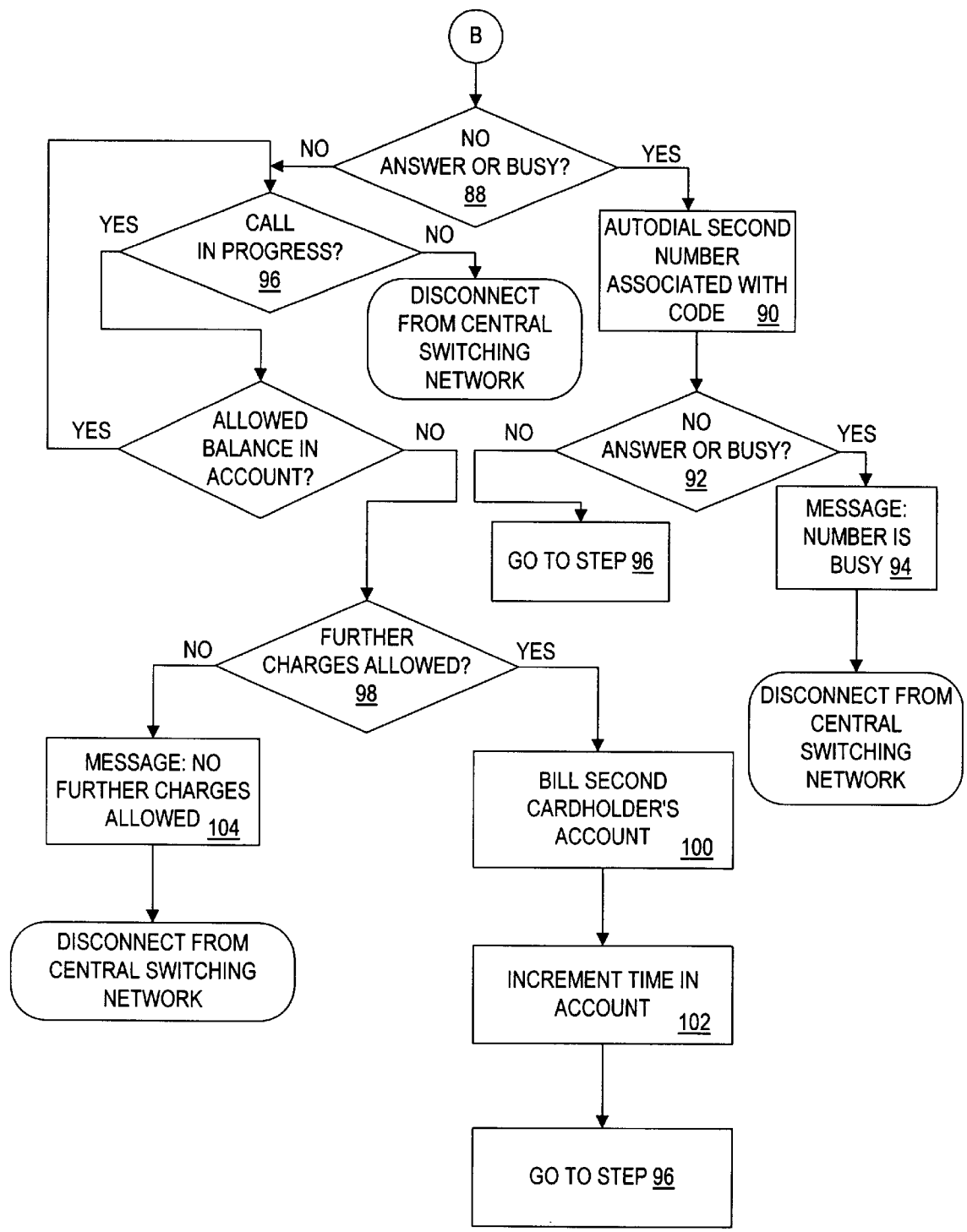
Figure 4:
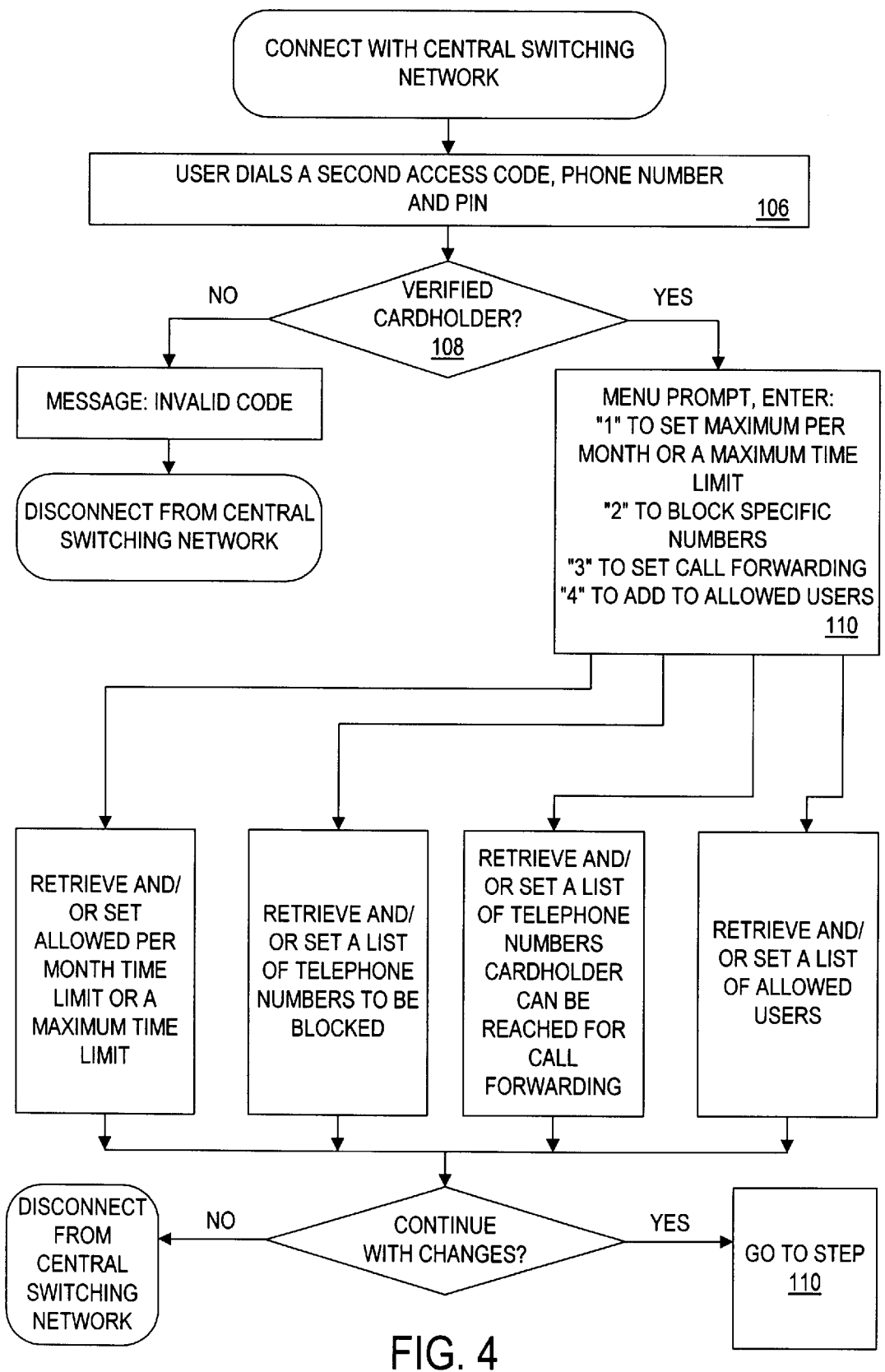
FIG. 4 is a functional block diagram of a system for reviewing and updating changeable cardholder information.

An illustrative sequence of the functional steps implemented by the system 10 are depicted in FIGS. 2–4. Referring now to FIGS. 2A and 2B the calling-party first dials the access number indicated on calling-card 20 at step 32, and connects with the central switching network 16 as previously described with regard to FIG. 1. The calling-party then enters the number of the called telephone station 22 at step 34, and the called number is stored in memory area 24 at step 36. The call processing computer 12 then accesses the authorized cardholder accounts database 26 in memory 14 to determine if the called number has an associated account at step 38. If the called number does not have an associated account, then an appropriate message is transmitted back to the calling station 18, indicating to the calling party that the called number is not associated with an account that can be charged at step 40, and the call is disconnected from the central switching network 16 by an appropriate signal from the call processing computer 12 to central switching network 16. If the called number has an associated cardholder account, the call processing computer 12 determines the current balance therein at step 44. The current balance of the account, as well as other cardholder information (e.g., billing information), is also stored in authorized cardholder accounts database 26. The balance of the account can be characterized as a monetary value, call time value or units value. Employing a units value enables different charges to be made for local, long distance or international calls, as well as an adjustment to be made for factors such as the time, date and/or week when the call is placed and the like. If the associated cardholder account has insufficient funds to pay for the cost of the telephone call, then a second account, such as a credit card or checking account, may be charged at step 46 and the balance of the calling-card account can be credited at step 48. In the preferred embodiment, charging and crediting of the cardholders' accounts may be done in blocks. For example, the cardholder's checking account can be debited by the cost of twenty (20) minutes of call time, and the card-holder's calling-card account can be automatically credited by such twenty (20) minutes of call time each time the balance of the calling-card account is reduced to zero (0) or some other preset level. This method of payment confers the benefits and convenience of a prepaid calling-card, without the drawbacks of having to "renew" the calling-card as currently exists in the prior art.

When the cardholder's calling-card account has a sufficient balance to cover the cost of the telephone call to the called telephone station 22, the call processing computer 12 retrieves the called number from the storage memory 24 and communicates the called number to the central switching network 16, which completes the call from the calling telephone station 18 to the called telephone station 22 at step 50. While the call is in progress at step 52, the call processing computer 12 debits the calling-card account using an appropriate billing rate, and continuously monitors the calling-card account balance at step 54. When this balance is depleted to the point where it becomes insufficient to cover the cost of the call, the second account of the cardholder is debited at step 56 and the calling-card account is credited at step 58. For the cardholder's and/or calling party's convenience, the system 10 can be made to generate a warning tone in the calling telephone receiver when a predetermined minimum balance is reached in the calling-card account. The calling party may then have the option of hanging up and incurring no further charges, or recharging the calling-card account for an additional block of time. Once the call is terminated, the calling telephone station 18 is disconnected from the central switching network 16.

In an alternative embodiment of the invention shown in FIGS. 3A, 3B and 3C the calling-party first dials the access number and either a code or a "*" followed by a code at step 60. The code in this instance can be any number that uniquely identifies the calling-card and the telephone number of an authorized telephone called station 22. The calling-party connects with the call processing computer 12 via the central switching network 16 as described above. The code is read by the call processing computer 12 and verified at step 64 using account information that associated with that code in the authorized cardholder account database 26 and cardholder entered information database 28.

At that time, any number of cardholder definable features can be implemented. For example, the cardholder might have specified in the cardholder entered information database 28 that the system 10 check the called number against a list of unauthorized numbers listed in cardholder entered information database 28, and handle the call appropriately. In another embodiment, the calling-party can be required to enter information (e.g., such as the calling-party's name), which can then be checked against a list of authorized calling-parties. The call processing computer 12 then retrieves the authorized telephone number(s) associated with the code at step 66.

Next, the call processing computer 12 determines whether a "*" has been entered before the code at step 68 and, if so, transmits the account balance to the calling-party at step 70, and requests that the calling-party indicate whether to complete the call at step 72. If the calling-party desires to complete the call, the call processing computer 12 signals the central switching network to continue to step 74 or to disconnect at step 76. At step 74, the call processing computer 12 determines whether the calling-card account balance is sufficient to continue the call. If funds are insufficient, the call processing computer 12 checks the cardholder entered information database 28 to determine whether further charges to the cardholder's second account are allowable at step 78, and either debits the second account at step 80 and credits the calling-card account at step 82 if allowable, or sends the calling-party an appropriate message at step 84 indicating that no further charges are authorized, and disconnects the calling-party from the central switching network 16. Assuming that sufficient funds are available, the call processing computer 12 sends the first number associated with the code to the central switching network 16 for completion of the telephone call to the called telephone station 22 at step 86. If there is no answer, or the line is busy at step 88, the call processing computer 12 then sends a second number at step 90 that was authorized by the cardholder and stored in the cardholder entered information database 28. If this call to the second number is not answered or is busy at step 92, then an appropriate message (i.e., line busy) can be generated at step 94 and the calling telephone station disconnected from the central switching network at step 76. Any number of authorized telephone numbers that are designated by the cardholder and stored in cardholder entered information database 28 may be alternately dialed. Additionally, a voice messaging system can be activated that records the calling-party's message, and periodically retries the number until the called-party answers the telephone call at the called telephone station 22. In the alternative, the calling-party can be prompted to enter, for example, either a "1" indicating to the call processing computer to try the called party at a first number, e.g., home, a "2" signaling the call processing computer 12 to try the called-party at a second number (e.g., work), or any other numbers designated by the cardholder. After the calling-party enters a choice, the system 10 then automatically dials that number.

Once the telephone call is connected, the balance of the calling-card account is debited and monitored. If the call proceeds from step 88, the call processing computer 12 determines whether the call is in progress at step 96. If so, and if the account balance falls below a predetermined minimum, the call processing computer 12 accesses the cardholder entered information database 28 to determine whether to charge the cardmember's second account at step 98. If further charges are authorized, then the second account is debited at step 100, the calling-card account credited at step 102, and the call permitted to continue. If additional charges are not authorized, then the call processing computer sends a message to that effect at step 104, and the call is disconnected.

Referring now to FIG. 4, there is shown a functional block diagram of the system 10 with regard to reviewing and updating the cardholder definable information in the cardholder entered information database 28. In this connection, the cardholder dials a second access code, phone number and identification number at to enter the system at step 106. If the cardholder is verified at step 108, the cardholder is then provided with a series of menu options via an interactive voice response unit IVRU at step 110. Such options may include retrieving and/or setting at least one of the following: a maximum time limit per month for the entire account or for individual users; a list of called telephone station numbers to be blocked; a list of telephone numbers at which the cardholder can be reached; a list of authorized users, etc. These options can be setup so that the user can continuously retrieve and/or set up each of the different options until completed, after which the cardholder disconnects from the network.

Figure 5:
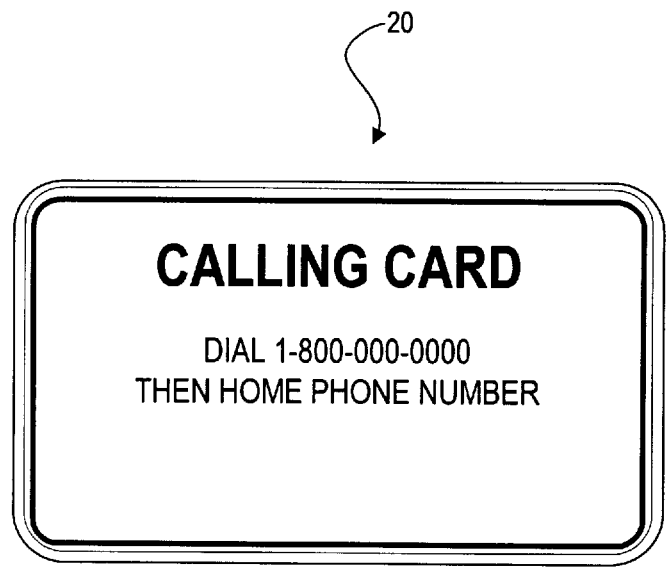
FIG. 5 is a plan view of an illustrative calling-card.

Finally, FIG. 5 depicts an exemplary calling-card in accordance with the present invention. Since the system 10 only requires that the calling-party provide an access code and the called party's telephone number, the configuration of the calling-card 20 itself, as with prior art calling-cards, is not crucial to the operation of the system. For convenience, the calling-card 20, or any reproductions thereof, can be given to any number of users. The calling-card can prominently list both the access code and the cardholder's home telephone number, since the risk of fraud is minimal. If lost or stolen, the calling card 20 only enables that telephone number (or the limited number of designated telephone numbers) to be called. The calling-card 20 can also contain other information, including addresses and specialized emergency information (e.g., medical, police, fire, etc.). The system 10 can provide itemized billing of called numbers, and the calling-card account can be closed and any unused portion thereof refunded, thus eliminating any breakage costs for unused time.

In a modified embodiment, the system 10 may include a redial messaging service that enables the calling-party to leave a message for the called-party if the called telephone station 22 is busy. To implement such a feature, the central computer 12 may include a memory area 25 in memory 14 that includes a program for prompting the calling-party through the IVRU to leave a message for the called party. The central computer 12 can automatically redial the called telephone station 22 and forward the message when it detects that the called number is no longer busy.

The present invention has been shown and described in what are considered to be the most practical and preferred embodiments. It is anticipated, however, that departures may be made therefrom and that obvious modifications will be implemented by persons skilled in the art.

What is claimed is:

1. A prepaid calling-card system, comprising:

a switching network connected between a calling telephone station and a called telephone station having a called number;

a call processor connected to said switching network; and a memory connected to said call processor, said memory storing at least one authorized number, and an account associated with said at least one authorized number including a prepaid account balance;

said call processor operative to receive said called number originating from said calling telephone station, compare said called number against said at least one authorized number and determine if said called number matches said at least one authorized number, control said switching network, if said called number comprises said at least one authorized number, to complete a call by connecting said calling telephone station to said called telephone station, and decrement said prepaid account balance based upon said call.

2. The pre-paid calling card system of claim 1 wherein said call processor is further operative to permit an owner of said account to alter said at least one authorized numbers.

3. The pre-paid calling card system of claim 1 wherein said call processor is further operative to.

periodically check said prepaid account balance; and initiate, when said account balance decreases below a predetermined minimum, a transfer of funds from a second account to said account to increase said account balance.

4. The pre-paid calling card system of claim 1 wherein:

said memory further stores a plurality of authorized calling telephone stations identified by respective authorized calling telephone numbers; and said call processor is further operative to receive and compare a calling telephone number to said authorized calling telephone numbers, and to complete said call only if said calling telephone number matches an authorized calling telephone number.

5. The pre-paid calling card system of claim 1 wherein:

said memory further stores multiple authorized numbers for a selected called telephone station; and said call processor further operative to receive from said calling telephone station a request to call said selected called telephone station, request from said calling telephone station a one of said multiple authorized numbers, and control said switching network to complete said call by connecting said calling telephone station to said called telephone station using said one of said multiple authorized numbers.

6. The pre-paid calling card system of claim 1 wherein:

said call has parameters associated therewith;

said memory further stores a predetermined limitation associated with said account; and said call processor is further operative to control said switching network to connect said call as long as the parameters of said call do not match said predetermined limitation.

7. The pre-paid calling card system of claim 6 wherein said predetermined limitation is a maximum time limit for said call.

8. The pre-paid calling system of claim 1 wherein:

said memory further stores a user-updatable access code in association with said account; and said call processor is further operative to receive and match a caller access code to said user-updatable access code before completing said call.

9. The pre-paid calling system of claim 1 wherein said processor is further operative to:

generate, upon detecting a busy signal at said called telephone station, a prompt for a message from said calling telephone station; and automatically, after the termination of said busy signal, forward said message to said called telephone station.

10. The pre-paid calling system of claim 1 wherein:

said memory further stores multiple authorized numbers for a selected called telephone station; and said call processor further operative to receive from said calling telephone station a request to call said selected called telephone station at a first of said multiple authorized numbers, if said selected called telephone station returns a busy signal, automatically control said switching network to complete said call by connecting said calling telephone station to said called telephone station using a second of said multiple authorized numbers.

11. A method for connecting a call between a calling telephone station and a called telephone station, the method comprising the steps of:

storing at least one authorized number, said authorized number being associated with an account having a prepaid account balance;

receiving a called number from the calling telephone station;

comparing said called number to said at least one authorized number to determine whether said called number matches said at least one authorized number;

initiating connection of the calling telephone station to the called telephone station based upon said called number matching said at least one authorized number; and decrementing said prepaid account balance based upon the call.

12. The method of claim 11 further comprising the steps of altering said at least one authorized number.

13. The method of claim 11 further comprising the steps of:

determining whether said account balance is less than a predetermined limit;

initiating a transfer of funds from a second account to said account upon determining said account balance is less than said predetermined limit.

14. The method of claim 11 further comprising the steps of:

storing at least one authorized calling telephone station identified by an authorized calling telephone number; and comparing a received calling telephone number to said authorized calling telephone number to determine whether said received calling telephone number matches said authorized calling telephone number;

and wherein said step of initiating connection is further based upon said received calling telephone number matching said authorized calling telephone number.

15. The method of claim 11 wherein said storing step includes storing multiple authorized numbers associated with a selected called telephone station, the method further comprising the steps of:

receiving from said calling telephone station a request to call said selected called telephone station; and requesting from said calling telephone station one of said multiple authorized numbers;

and wherein said step of initiating connection includes connecting the calling telephone station to the called telephone station using said one of said multiple authorized numbers.

16. The method of claim 11 wherein said call has a parameter associated therewith, the method further comprises the step of:

storing a predetermined limitation associated with said account;

and wherein said step of initiating connection includes connecting said call as long as said parameter does not meet said predetermined limitation.

17. The method of claim 16 wherein said predetermined limitation is a maximum time limit for the call.

18. The method of claim 11 further comprising the steps of:

storing a user-updatable access code associated with said account;

receiving a caller access code; and comparing said user-updatable access code with said caller access code to determine whether said user-updatable access code matches said caller access code;

and wherein said step of initiating connection is further based upon said user-updatable access code matching said caller access code.

19. The method of claim 11 further comprising the steps of:

initiating a prompt for a message from the calling telephone station upon detecting a busy signal at the called telephone station;

receiving said message; and automatically forwarding said message to the called telephone station upon termination of said busy signal.

20. The method of claim 11 further comprising the steps of:

storing multiple authorized numbers associated with a selected called telephone station;

receiving from the calling telephone station a request to call said selected called telephone station using a first of said multiple authorized numbers;

determining whether said selected called telephone station returns a busy signal;

and wherein said step of initiating connection includes automatically connecting the calling telephone station with the caller telephone station by using a second of said multiple authorized numbers.

21. An article of manufacture comprising:

a computer readable medium having computer readable program code embodied therein, said computer readable program code comprising:

means for storing at least one authorized number and an account having a prepaid account balance, said at least one authorized number associated with said account;

means for receiving a called number from a calling telephone station;

means for comparing said called number to said at least one authorized number;

means for initiating connection of a call between said calling telephone stations and a called telephone station based upon said called number matching said at least one authorized number; and means for decrementing said prepaid account balance based upon said call.

* * * * *

UNITED STATES PATENT AND TRADEMARK OFFICE
CERTIFICATE OF CORRECTION

PATENT NO.   : 5,825,863
DATED        : October 20, 1998
INVENTOR(S)  : Jay S. WALKER It is certified that error appears in the above-indentified patent and that said Letters Patent is hereby corrected as shown below:

On the title page, item [22] Filed: should read -- December 11, 1995 --

Signed and Sealed this

Twelfth Day of October, 1999

Attest:

Q. TODD DICKINSON

Attesting Officer

Acting Commissioner of Patents and Trademarks